United States Patent
Kondo et al.

(10) Patent No.: US 11,763,840 B2
(45) Date of Patent: Sep. 19, 2023

(54) INFORMATION PROCESSING DEVICE, INFORMATION PROCESSING METHOD, AND INFORMATION PROCESSING PROGRAM

(71) Applicant: FUJIFILM CORPORATION, Tokyo (JP)

(72) Inventors: Michitaka Kondo, Tokyo (JP); Yutaka Oishi, Tokyo (JP); Takashi Miyamoto, Tokyo (JP); Terue Watanabe, Tokyo (JP); Koji Matsumura, Tokyo (JP); Yuko Uno, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/818,714

(22) Filed: Aug. 10, 2022

(65) Prior Publication Data

US 2022/0383897 A1    Dec. 1, 2022

Related U.S. Application Data

(63) Continuation of application No. PCT/JP2020/038128, filed on Oct. 8, 2020.

(30) Foreign Application Priority Data

Feb. 28, 2020 (JP) .................................. 2020-034305

(51) Int. Cl.
*G11B 5/008* (2006.01)
(52) U.S. Cl.
CPC ................................ *G11B 5/00813* (2013.01)

(58) Field of Classification Search
None
See application file for complete search history.

(56) References Cited

U.S. PATENT DOCUMENTS 6,675,257 B1    1/2004  Khalid et al.
2001/0033517 A1*  10/2001  Ando .................. G11B 27/329
(Continued)

FOREIGN PATENT DOCUMENTS

EP    2372715 A1    10/2011
JP    2006-031446 A    2/2006
(Continued)

OTHER PUBLICATIONS

International Search Report issued in International Application No. PCT/JP2020/038128 dated Dec. 15, 2020.
(Continued)

*Primary Examiner* — Peter Vincent Agustin
(74) *Attorney, Agent, or Firm* — SOLARIS Intellectual Property Group, PLLC (57) ABSTRACT

An information processing device performs control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update.

18 Claims, 6 Drawing Sheets

(56) References Cited

U.S. PATENT DOCUMENTS

| | | | |
|---|---|---|---|
| 2004/0105331 A1* | 6/2004 | Kanai | H04N 5/76 |
| 2005/0022095 A1* | 1/2005 | Lee | G11B 20/1833 |
| | | | 714/759 |
| 2005/0271359 A1* | 12/2005 | Nakai | G11B 5/86 |
| 2006/0008255 A1* | 1/2006 | Yen | G11B 20/10009 |
| 2006/0015680 A1 | 1/2006 | Otsuka et al. | |
| 2008/0151291 A1 | 6/2008 | Ohno et al. | |
| 2016/0077757 A1* | 3/2016 | Hasegawa | G11B 27/328 |
| | | | 711/111 |
| 2021/0005221 A1* | 1/2021 | Miyamoto | G11B 20/1201 |
| 2022/0383897 A1* | 12/2022 | Kondo | G11B 27/107 |

FOREIGN PATENT DOCUMENTS

| | | |
|---|---|---|
| JP | 2007-200306 A | 8/2007 |
| JP | 2016-053895 A | 4/2016 |
| WO | 2016/199230 A1 | 12/2016 |
| WO | 2019/181949 A1 | 9/2019 |

OTHER PUBLICATIONS

Written Opinion of the ISA issued in International Application No. PCT/JP2020/038128 dated Dec. 15, 2020.
Extended European Search Report dated Jul. 6, 2023, issued in corresponding EP Patent Application No. 20921793.4.

\* cited by examiner

INFORMATION PROCESSING DEVICE, INFORMATION PROCESSING METHOD, AND INFORMATION PROCESSING PROGRAM

CROSS-REFERENCE TO RELATED APPLICATIONS

This application is a continuation application of International Application No. PCT/JP2020/038128, filed Oct. 8, 2020, the disclosure of which is incorporated herein by reference in its entirety. Further, this application claims priority from Japanese Patent Application No. 2020-034305, filed on Feb. 28, 2020, the disclosure of which is incorporated herein by reference in its entirety.

BACKGROUND

1. Technical Field

The present disclosure relates to an information processing device, an information processing method, and an information processing program.

2. Description of the Related Art

A technique of detecting data except for data with an update date and time closest to the present time point out of the same data recorded on a magnetic tape, as invalid data, on the basis of storage history data related to a history of processing in which data is backed up to a magnetic tape is disclosed (see JP2006-31446A). In this technique, out of the data stored on the magnetic tape, data except for the detected invalid data is stored on a new magnetic tape.

In addition, a technique of updating index information to "1", "2", . . . , each time data recorded on a magnetic tape is updated is disclosed (see JP2007-200306A).

SUMMARY

Incidentally, there is known an object storage system that handles data not as a file unit or a block unit but as an object unit including data and metadata related to the data. In this object storage system, an object is assigned a unique object ID in the system, as identification information. The object to be accessed by a user is uniquely specified by the object ID.

Further, in the object storage system, in a case where a saved object is updated, the updated object is newly stored, instead of updating a part of the object, that is, overwriting and saving a part of the object. The updated object is assigned a new object ID. In other words, in the object storage system, a new version of the object is stored each time the object is updated.

As described above, in the object storage system, since the number of objects increases each time the object is updated, it is preferable to be able to delete a specific version of the object. In a case where a recording medium capable of random access, such as a hard disk drive (HDD) or a solid state drive (SSD), is used for the object storage system, only the object with the object ID to be deleted can be deleted.

On the other hand, in a case where a magnetic tape is used for an object storage, it is difficult to delete only the object with the object ID to be deleted. JP2006-31446A discloses that only the latest object is recorded on a new magnetic tape, but does not disclose how to realize a function of deleting a specific version of the object. JP2007-200306A also does not disclose how to realize the function of deleting the specific version of the object.

The present disclosure has been made in view of the above circumstances, and an object thereof is to provide an information processing device, an information processing method, and an information processing program capable of realizing a function of deleting a specific version of an object recorded on a magnetic tape in an object storage system.

An information processing device of the present disclosure is an information processing device comprising: at least one processor, in which the processor performs control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update.

In the information processing device of the present disclosure, the recording medium may be one or more magnetic tapes.

Further, in the information processing device of the present disclosure, the magnetic tape on which the object is recorded and the magnetic tape on which the deletion information is recorded may be the same magnetic tape.

Alternatively, in the information processing device of the present disclosure, the magnetic tape on which the object is recorded and the magnetic tape on which the deletion information is recorded may be magnetic tapes different from each other.

Further, in the information processing device of the present disclosure, only the deletion information, out of the object and the deletion information, may be recorded on the magnetic tape on which the deletion information is recorded.

Further, in the information processing device of the present disclosure, the magnetic tape on which the deletion information is recorded may have a first partition in which the data is recorded and a second partition in which the metadata is recorded, and the processor may perform control to record the deletion information in the second partition of the magnetic tape.

Alternatively, in the information processing device of the present disclosure, the deletion information may be recorded in a database held in a storage unit of the information processing device or an information processing device accessible from the information processing device.

Further, in the information processing device of the present disclosure, information indicating whether or not an object to be deleted is recorded on the same recording medium as the recording medium on which the deletion information is recorded may be added to the deletion information.

Further, an information processing method of the present disclosure is an information processing method executed by a processor provided in an information processing device, the method comprising: performing control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update.

Further, an information processing program of the present disclosure is an information processing program for causing a processor provided in an information processing device to execute a process comprising: performing control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update.

According to the present disclosure, it is possible to realize a function of deleting a specific version of an object recorded on a magnetic tape in an object storage system.

DETAILED DESCRIPTION

Hereinafter, examples of embodiments of the technique of the present disclosure will be described in detail with reference to the drawings.

Figure 1:
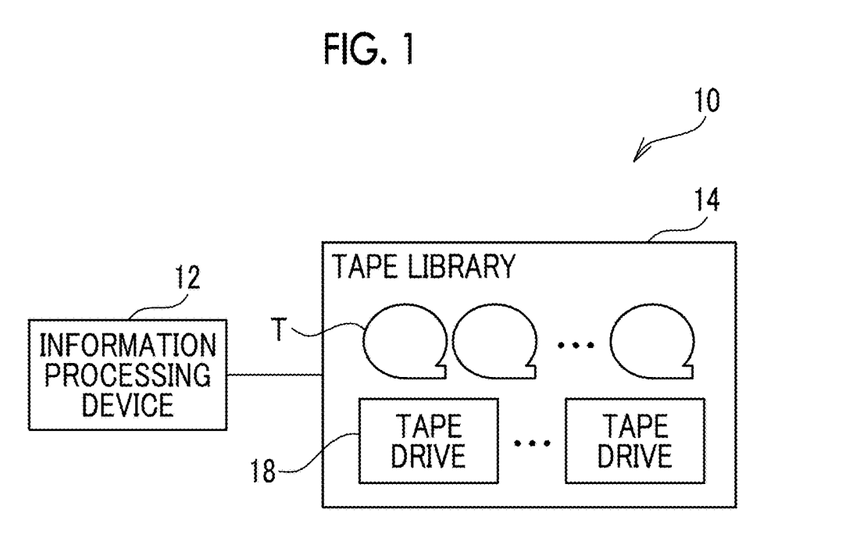
FIG. 1 is a block diagram showing an example of a configuration of a recording and reproducing system.

First, a configuration of a recording and reproducing system 10 according to the present embodiment will be described with reference to FIG. 1. As shown in FIG. 1, the recording and reproducing system 10 includes an information processing device 12 and a tape library 14.

The tape library 14 comprises a plurality of slots (not shown) and a plurality of tape drives 18, and a magnetic tape T as an example of a recording medium is stored in each slot. Each tape drive 18 is connected to the information processing device 12. An example of the magnetic tape T includes a linear tape-open (LTO) tape.

In a case where the information processing device 12 writes or reads data with respect to the magnetic tape T, the magnetic tape T to be written or read is loaded from the slot into the predetermined tape drive 18. In a case where the writing or reading of data with respect to the magnetic tape T loaded into the tape drive 18 is completed, the magnetic tape T is unloaded from the tape drive 18 to the originally stored slot.

Figure 2:
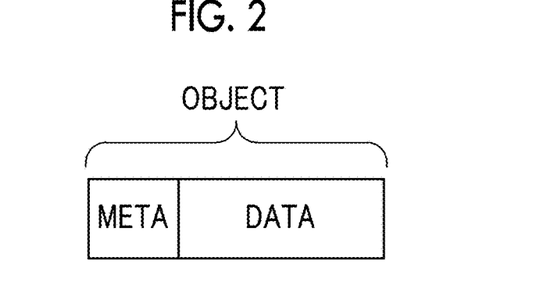
FIG. 2 is a diagram illustrating an object.

In the present embodiment, as shown in FIG. 2 as an example, an aspect will be described, as an example, in which an object including data to be saved by a user, such as document data and image data, and metadata related to the data is applied as a unit for handling data recorded on the magnetic tape T. In the example of FIG. 2, the metadata is expressed as "meta". A storage system that handles this object is referred to as an object storage system. The metadata includes, for example, object identification information, such as an object identifier (ID), data identification information, such as a data name, data size, and attribute information, such as a time stamp.

Figure 3:
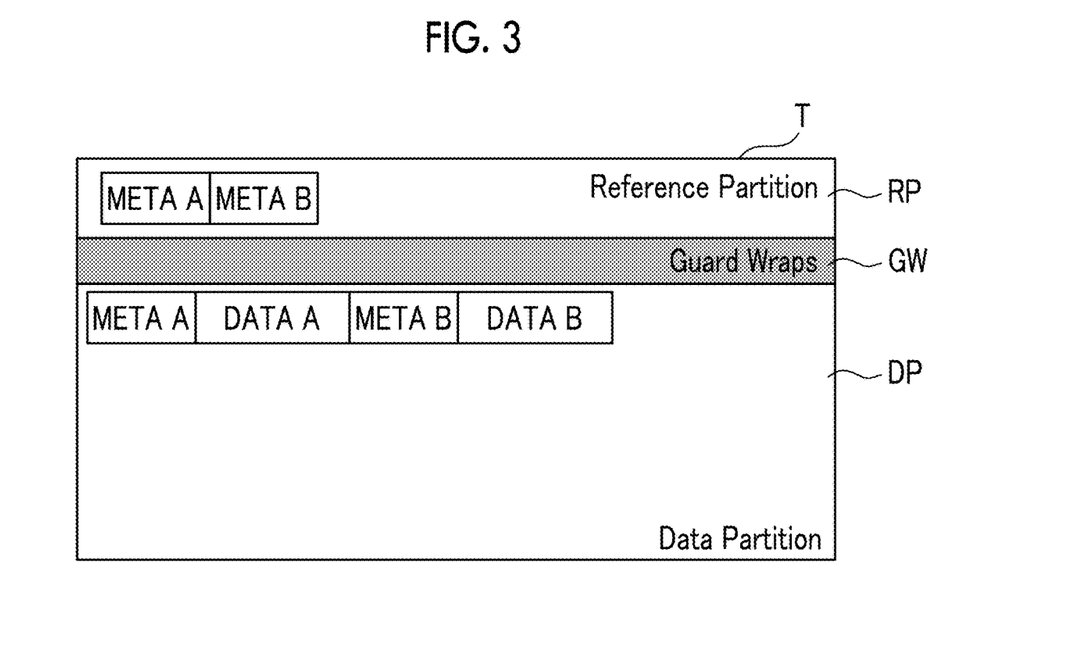
FIG. 3 is a schematic diagram showing an example of a magnetic tape.

Next, a configuration of the magnetic tape T according to the present embodiment will be described with reference to FIG. 3. As shown in FIG. 3, the magnetic tape T is divided into two partitions, that is, a reference partition RP in which metadata is recorded and a data partition DP in which an object is recorded, in a case where the magnetic tape T is formatted. As shown in FIG. 3, in the present embodiment, in a case where the object is recorded in the data partition DP, the object is recorded in the order of metadata and data. Further, the reference partition RP and the data partition DP are divided by guard wraps GW including a plurality of wraps. The data partition DP is an example of the first partition according to the disclosed technique, and the reference partition RP is an example of the second partition according to the disclosed technique. In an object group recorded in the data partition DP of the magnetic tape T, an object including only data may exist, or an object including only metadata may exist, out of the data and the metadata.

Figure 4:
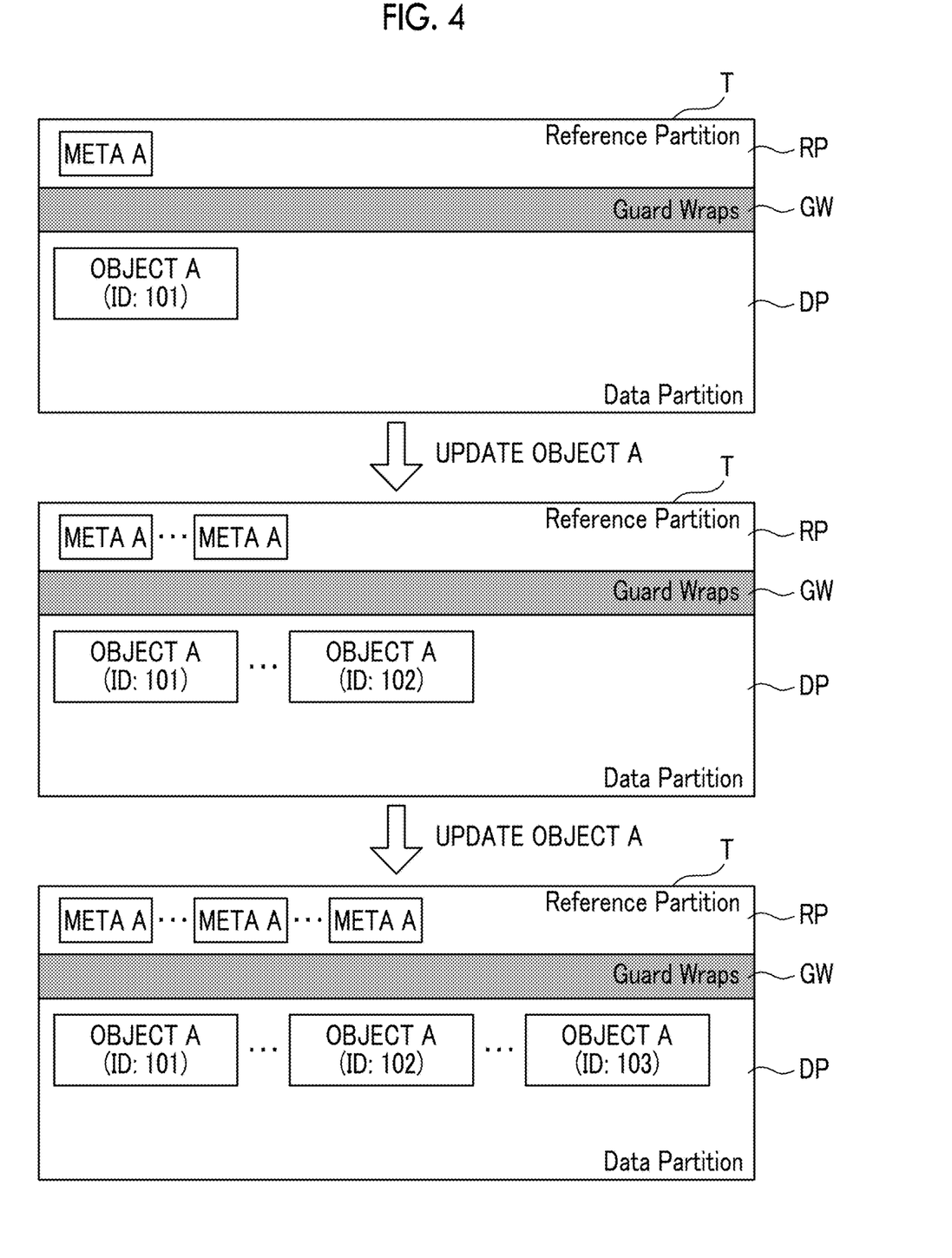
FIG. 4 is a diagram illustrating object update processing.

Next, object update processing in the recording and reproducing system 10 according to the present embodiment will be described with reference to FIG. 4. As shown in FIG. 4, the user operates a user terminal to newly register the object including data and metadata related to the data in the recording and reproducing system 10 by using an application programming interface (API) that is used to handle the object. In the recording and reproducing system 10, the object registered by the user is recorded on the magnetic tape T through the control performed by the information processing device 12. FIG. 4 shows an example in which an object with an object ID "101" is registered.

Next, in a case where the user updates the registered object, the user inputs the updated object and an instruction to update the object, to the information processing device 12 via the user terminal. In a case where the instruction to update the object is input, the information processing device 12 performs control to record the updated object assigned an object ID different from the object that has been recorded on the magnetic tape T, on the magnetic tape T. FIG. 4 further shows an example in which the object with the object ID "101" is updated and then assigned "102" as the object ID of the updated object. The updated object here means an object input by the user together with the update instruction, and the object may not be actually updated and may have the same contents as the object before the update. For example, in FIG. 4, the objects having object IDs "101" and "102" may be the same.

The same processing is repeated in a case where the object is further updated. FIG. 4 further shows an example in which the object with the object ID "102" is updated and then assigned "103" as the object ID of the updated object.

That is, in the present embodiment, in a case where the object is updated, the updated object is assigned an object ID different from the object before the update.

In the present embodiment, as described above, the function of deleting a specific version of the object recorded on the magnetic tape T in the recording and reproducing system 10 in which the new version of the object is stored each time the object is updated is realized.

Figure 5:
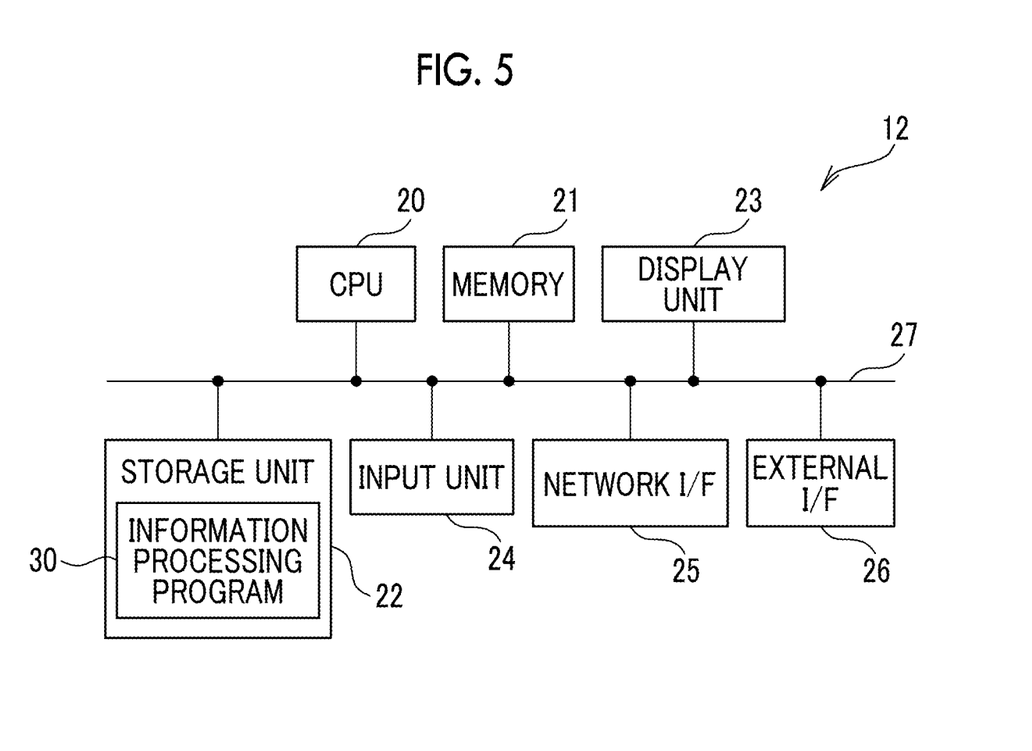
FIG. 5 is a block diagram showing an example of a hardware configuration of an information processing device.

Next, the hardware configuration of the information processing device 12 according to the present embodiment will be described with reference to FIG. 5. As shown in FIG. 5, the information processing device 12 includes a central processing unit (CPU) 20, a memory 21 serving as a temporary storage area, and a non-volatile storage unit 22. Further, the information processing device 12 includes a display unit 23, such as a liquid crystal display, an input unit 24, such as a keyboard and a mouse, a network interface (I/F) 25 connected to a network, and an external I/F 26 to which the tape drive 18 is connected. The CPU 20, the memory 21, the storage unit 22, the display unit 23, the input unit 24, the network I/F 25, and the external I/F 26 are connected to a bus 27.

The storage unit 22 is realized by a hard disk drive (HDD), a solid state drive (SSD), a flash memory, or the like. An information processing program 30 is stored in the storage unit 22 serving as a storage medium. The CPU 20 reads out the information processing program 30 from the storage unit 22 and then develops the information processing program 30 in the memory 21, and executes the developed information processing program 30. An example of the information processing device 12 includes a server computer.

Figure 6:
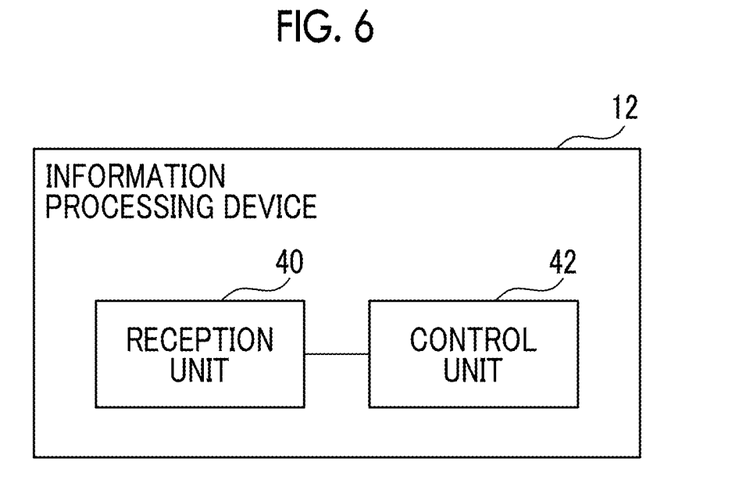
FIG. 6 is a block diagram showing an example of a functional configuration of the information processing device.

Next, a functional configuration of the information processing device 12 according to the present embodiment will be described with reference to FIG. 6. As shown in FIG. 6, the information processing device 12 includes a reception unit 40 and a control unit 42. The CPU 20 executes the information processing program 30 to function as the reception unit 40 and the control unit 42.

The reception unit 40 receives a specific object ID designated by the user terminal and an instruction to delete the object with the object ID.

Figure 7:
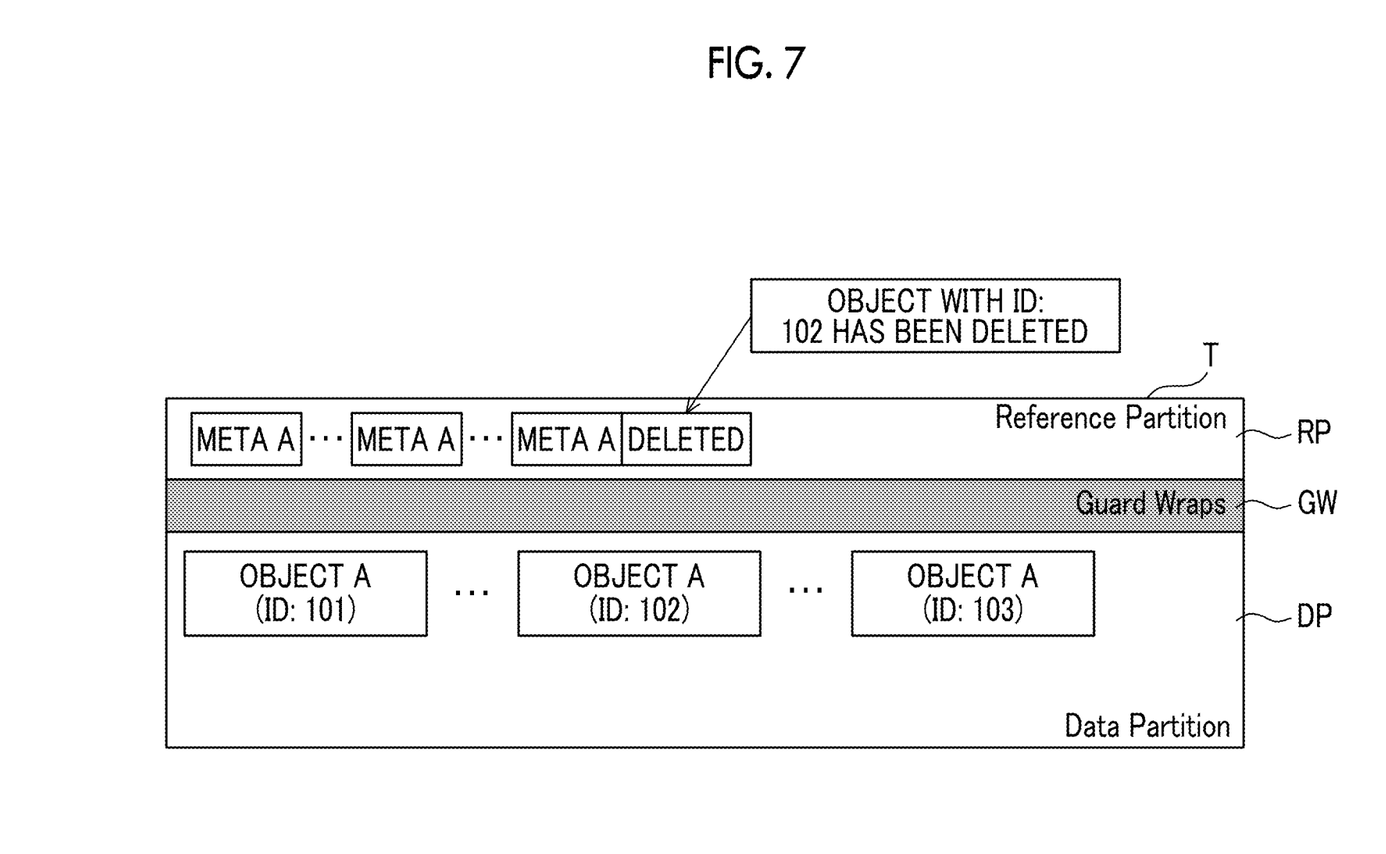
FIG. 7 is a diagram illustrating processing of recording deletion information on the magnetic tape.

The control unit 42 performs control to record information indicating that the object has been deleted (hereinafter, referred to as "deletion information"), on the magnetic tape T on which the object with the object ID received by the reception unit 40 is recorded. Specifically, as shown in FIG. 7, the control unit 42 performs control to record the deletion information in the reference partition RP of one magnetic tape T which is the same as the magnetic tape on which the object to be deleted is recorded. FIG. 7 shows an example in which an instruction to delete the object with object ID "102" is input.

Figure 8:
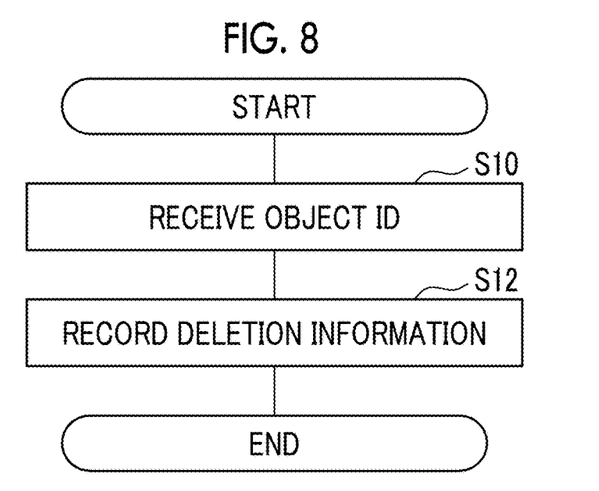
FIG. 8 is a flowchart showing an example of object deletion processing.
Figure 9:
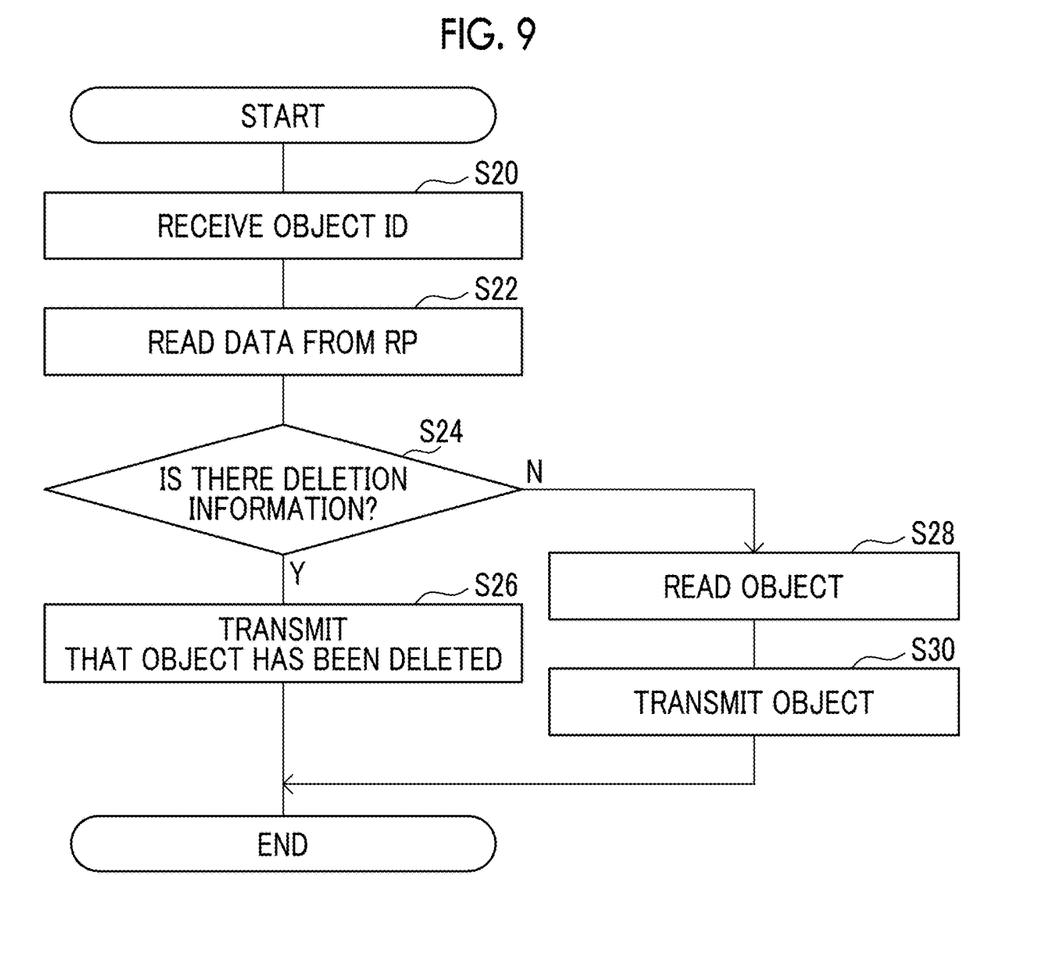
FIG. 9 is a flowchart showing an example of object reading processing.

Next, an action of the information processing device 12 according to the present embodiment will be described with reference to FIGS. 8 and 9. The CPU 20 executes the information processing program 30, whereby object deletion processing shown in FIG. 8 and object reading processing shown in FIG. 9 are executed. The object deletion processing shown in FIG. 8 is executed, for example, in a case where an instruction to delete an object and an object ID of the object to be deleted are input to the information processing device 12 from the user terminal. The object reading processing shown in FIG. 9 is executed, for example, in a case where an instruction to read an object and an object ID of the object to be read are input from the user terminal.

In step S10 of FIG. 8, the reception unit 40 receives a specific object ID input from the user terminal and an instruction to delete an object with the object ID.

In step S12, as described above, the control unit 42 performs control to record the deletion information indicating that the object has been deleted, on the magnetic tape T on which the object with the object ID received in step S10 is recorded. In a case where the processing of step S12 ends, the object deletion processing ends.

In step S20 of FIG. 9, the reception unit 40 receives an instruction to read an object input from the user terminal and the object ID of the object to be read. In step S22, the control unit 42 performs control to read data from the reference partition RP of the magnetic tape T on which the object with the object ID received in step S20 is recorded.

In step S24, the control unit 42 determines whether or not the data read in step S22 includes the deletion information of the object with the object ID received in step S20. In a case where an affirmative determination is made in step S24, the process proceeds to step S26. In step S26, the control unit 42 transmits information indicating that the object with the object ID designated by the user terminal has been deleted, to the user terminal. In a case where the processing of step S26 ends, the object reading processing ends.

On the other hand, in a case where a negative determination is made in step S24, the process proceeds to step S28. In step S28, the control unit 42 performs control to read the object with the object ID received in step S20, from the data partition DP of the same magnetic tape T as in step S22. In step S30, the control unit 42 transmits the object read in step S28 to the user terminal. In a case where the processing of step S30 ends, the object reading processing ends.

As described above, according to the present embodiment, it is possible to realize the function of deleting a specific version of the object recorded on the magnetic tape in the object storage system.

In the above-described embodiment, the case where the deletion information is recorded on one magnetic tape T has been described, but the present disclosure is not limited thereto. For example, an aspect may be employed in which the deletion information is recorded on a plurality of magnetic tapes T. With this, reliability can be enhanced.

Further, in the above-described embodiment, the case where the magnetic tape T on which the object to be deleted is recorded and the magnetic tape T on which the deletion information is recorded are the same magnetic tape has been described, but the present disclosure is not limited thereto. For example, the magnetic tape T on which the object to be deleted is recorded and the magnetic tape T on which the deletion information is recorded may be magnetic tapes different from each other.

Further, in the above-described embodiment, only the deletion information, out of the object and the deletion information, may be recorded on the magnetic tape T on which the deletion information is recorded. In other words, a magnetic tape T dedicated to deletion information may be prepared.

Further, in the above-described embodiment, the case where the deletion information is recorded on the magnetic tape T has been described, but the present disclosure is not limited thereto. For example, the deletion information may be recorded in a database held in the storage unit 22 of the information processing device 12. Alternatively, for example, the deletion information may be recorded in a database held in a storage unit of an information processing device accessible from the information processing device 12. In this case, examples of the information processing device accessible from the information processing device 12 include a cloud server accessible from the information processing device 12 via a network.

Further, in the above-described embodiment, information indicating whether or not the object to be deleted is recorded on the same magnetic tape T as the magnetic tape T on which the deletion information is recorded may be added to the deletion information. With this, it is possible to easily grasp whether or not the object to be deleted and the deletion information are recorded on the same magnetic tape T.

Figure 10:
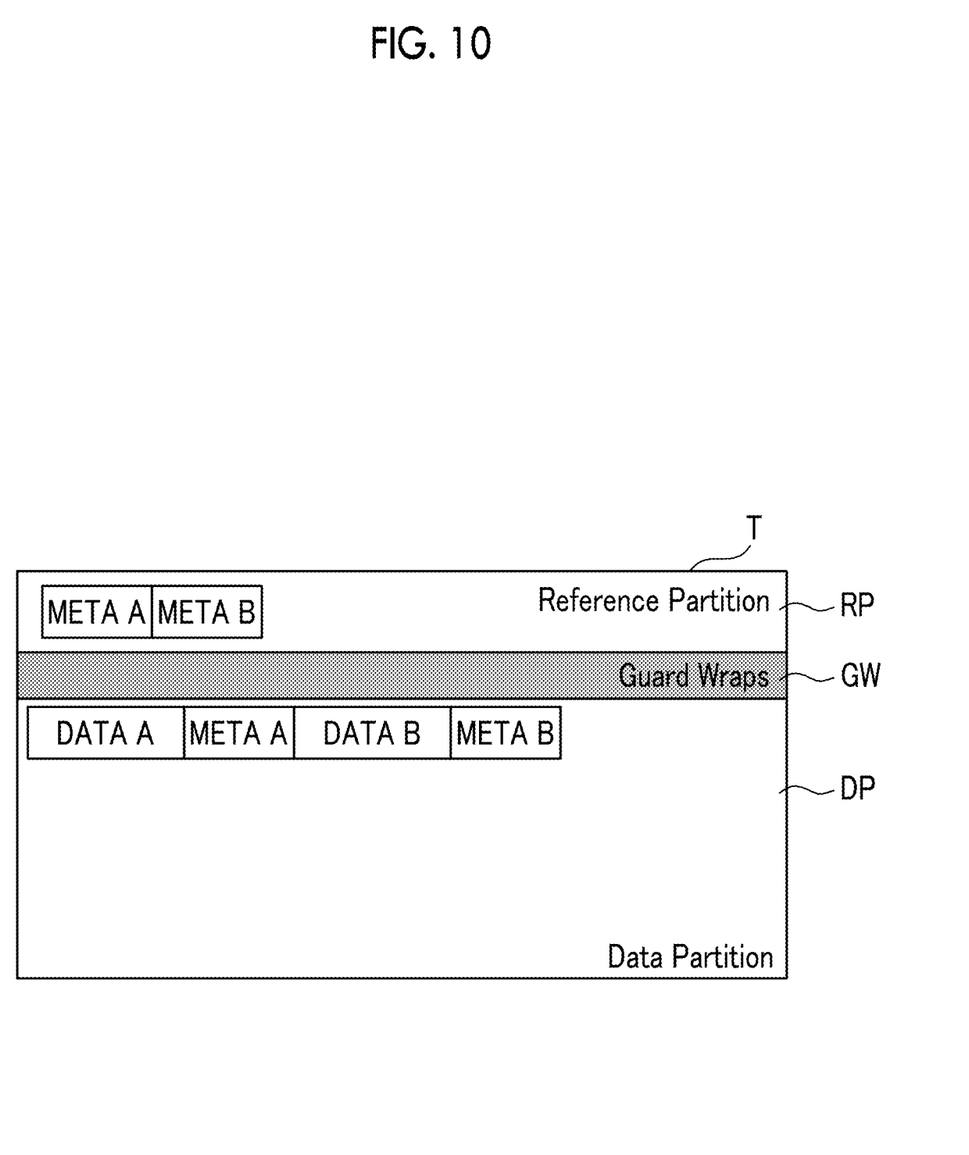
FIG. 10 is a schematic diagram illustrating a recording order of data and metadata according to a modification example.

Further, in the above-described embodiment, the case where the object is recorded in the order of metadata and data in a case where the information processing device 12 records the object in the data partition DP of the magnetic tape T has been described (see FIG. 3), but the present disclosure is not limited thereto. For example, as shown in FIG. 10, an aspect may be employed in which the object is recorded in the order of data and metadata in a case where the information processing device 12 records the object in the data partition DP of the magnetic tape T.

Further, in the above-described embodiment, for example, the following various processors can be used as the hardware structure of a processing unit that executes various kinds of processing, such as the reception unit 40 and the control unit 42. The above-described various processors include, for example, a programmable logic device (PLD) which is a processor having a changeable circuit configuration after manufacture, such as an FPGA, and a dedicated electrical circuit which is a processor having a dedicated circuit configuration designed to perform specific processing, such as an application specific integrated circuit (ASIC), in addition to the CPU which is a general-purpose processor that executes software (programs) to function as various processing units, as described above.

One processing unit may be composed of one of these various processors or a combination of two or more processors of the same type or different types (for example, a combination of a plurality of FPGAs or a combination of a CPU and an FPGA). Alternatively, a plurality of processing units may be composed of one processor.

A first example in which a plurality of processing units are composed of one processor is an aspect in which one or more CPUs and software are combined to constitute one processor and the processor functions as the plurality of processing units, as typified by a computer, such as a client and a server. A second example is an aspect in which a processor that realizes all the functions of a system including the plurality of processing units with one integrated circuit (IC) chip is used, as typified by a system on chip (SoC). As described above, various processing units are formed of one or more of the above-described various processors as the hardware structure.

Further, as the hardware structure of these various processors, more specifically, an electric circuit (circuitry) in which circuit elements, such as semiconductor elements, are combined can be used.

Further, in the above-described embodiment, the aspect in which the information processing program 30 is stored (installed) in the storage unit 22 in advance has been described, but the present disclosure is not limited thereto. The information processing program 30 may be provided in a form of being recorded on a recording medium, such as a compact disc read only memory (CD-ROM), a digital versatile disc read only memory (DVD-ROM), and a Universal Serial Bus (USB) memory. Alternatively, the information processing program 30 may be downloaded from an external device via a network.

The disclosure of JP2020-034305 filed on Feb. 28, 2020 is incorporated herein by reference in its entirety. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. An information processing device comprising:
at least one processor,
wherein the processor
performs control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update,
wherein information, indicating whether or not an object to be deleted is recorded on the same recording medium as the recording medium on which the deletion information is recorded, is added to the deletion information.

2. The information processing device according to claim 1,
wherein the recording medium is one or more magnetic tapes.

3. The information processing device according to claim 2,
wherein the magnetic tape on which the object is recorded and the magnetic tape on which the deletion information is recorded are the same magnetic tape.

4. The information processing device according to claim 2,
wherein the magnetic tape on which the object is recorded and the magnetic tape on which the deletion information is recorded are magnetic tapes different from each other.

5. The information processing device according to claim 4,
wherein only the deletion information, out of the object and the deletion information, is recorded on the magnetic tape on which the deletion information is recorded.

6. The information processing device according to claim 2,
wherein the magnetic tape on which the deletion information is recorded has a first partition in which the data is recorded and a second partition in which the metadata is recorded, and
the processor performs control to record the deletion information in the second partition of the magnetic tape.

7. The information processing device according to claim 1,
wherein the deletion information is recorded in a database held in a storage unit of the information processing device or an information processing device accessible from the information processing device.

8. The information processing device according to claim 3,
wherein the magnetic tape on which the deletion information is recorded has a first partition in which the data is recorded and a second partition in which the metadata is recorded, and
the processor performs control to record the deletion information in the second partition of the magnetic tape.

9. The information processing device according to claim 4, wherein the magnetic tape on which the deletion information is recorded has a first partition in which the data is recorded and a second partition in which the metadata is recorded, and the processor performs control to record the deletion information in the second partition of the magnetic tape.

10. The information processing device according to claim 5, wherein the magnetic tape on which the deletion information is recorded has a first partition in which the data is recorded and a second partition in which the metadata is recorded, and the processor performs control to record the deletion information in the second partition of the magnetic tape.

11. The information processing device according to claim 2, wherein information indicating whether or not an object to be deleted is recorded on the same recording medium as the recording medium on which the deletion information is recorded is added to the deletion information.

12. The information processing device according to claim 3, wherein information indicating whether or not an object to be deleted is recorded on the same recording medium as the recording medium on which the deletion information is recorded is added to the deletion information.

13. The information processing device according to claim 4, wherein information indicating whether or not an object to be deleted is recorded on the same recording medium as the recording medium on which the deletion information is recorded is added to the deletion information.

14. The information processing device according to claim 5, wherein information indicating whether or not an object to be deleted is recorded on the same recording medium as the recording medium on which the deletion information is recorded is added to the deletion information.

15. The information processing device according to claim 6, wherein information indicating whether or not an object to be deleted is recorded on the same recording medium as the recording medium on which the deletion information is recorded is added to the deletion information.

16. The information processing device according to claim 7, wherein information indicating whether or not an object to be deleted is recorded on the same recording medium as the recording medium on which the deletion information is recorded is added to the deletion information.

17. An information processing method executed by a processor provided in an information processing device, the method comprising:

performing control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update, wherein information, indicating whether or not an object to be deleted is recorded on the same recording medium as the recording medium on which the deletion information is recorded, is added to the deletion information.

18. A non-transitory computer-readable storage medium storing an information processing program for causing a processor provided in an information processing device to execute a process comprising:

performing control to record deletion information indicating that an object with a designated object ID has been deleted, on a recording medium, in a case where a specific object ID is designated and an instruction to delete the object is input, for a magnetic tape on which an object that includes data and metadata related to the data and that is assigned an object ID as identification information is recorded, the object being assigned an object ID in a case where the object is updated different from an object ID of the object before the update, wherein information, indicating whether or not an object to be deleted is recorded on the same recording medium as the recording medium on which the deletion information is recorded, is added to the deletion information.

* * * * *